United States Patent [19]

Pappa et al.

[11] Patent Number: 6,153,112
[45] Date of Patent: *Nov. 28, 2000

[54] PHOTOCATALYTIC PROCESS FOR PURIFYING WATER POLLUTED BY TETRAHYDROTHIOPHENE

[75] Inventors: Rosario Pappa, Monterotondo; Edoardo D'Angeli, Rome, both of Italy

[73] Assignee: EniTecnologie, S.p.A., San Donato Mil. Se, Italy

[*] Notice: This patent is subject to a terminal disclaimer.

[21] Appl. No.: 09/441,048

[22] Filed: Nov. 16, 1999

Related U.S. Application Data

[63] Continuation of application No. 09/089,161, Jun. 2, 1998, Pat. No. 6,027,654.

[30] Foreign Application Priority Data

Jun. 5, 1997 [IT] Italy .................................. MI97A1324

[51] Int. Cl.$^7$ ....................................................... C02F 1/32
[52] U.S. Cl. .......................... 210/748; 210/763; 210/908; 210/916
[58] Field of Search .................................... 210/748, 163, 210/908, 909, 916

[56] References Cited

U.S. PATENT DOCUMENTS

| | | | |
|---|---|---|---|
| 3,977,952 | 8/1976 | Knoevenagel et al. | 204/157.1 R |
| 4,861,484 | 8/1989 | Lichtin et al. | 210/763 |
| 5,118,422 | 6/1992 | Cooper et al. | 210/636 |
| 5,275,741 | 1/1994 | Miano et al. | 210/748 |
| 5,294,315 | 3/1994 | Cooper et al. | 210/748 |
| 5,501,801 | 3/1996 | Zhang et al. | 210/748 |
| 5,589,078 | 12/1996 | Butters et al. | 210/748 |
| 5,643,457 | 7/1997 | Abramov et al. | 210/748 |
| 5,702,615 | 12/1997 | Numata et al. | 210/759 |
| 6,027,654 | 2/2000 | Pappa et al. | 210/748 |

FOREIGN PATENT DOCUMENTS

WO 91 09823  7/1991  WIPO .

OTHER PUBLICATIONS

R. Carlisle Chambers et al., Redox Catalysis Involving Substrate Photooxidation with Catalyst Regeneration by Substrate Reduction, Simultaneous Oxidative C–H Bond Cleavage and Reductive C–S Bond Cleavage in Thioethers Catalyzed by $W_{10}O_{32}^{4-n}$, Journal of the American Chemical Society, vol. 112, No. 23, pp. 8427–8433, Nov. 7, 1990.

R. Carlisle Chambers et al., "Comparative Study of Polyoxometalates and Semiconductor Metal Oxides as Catalysts. Photochemical Oxidative Degradation of Thioethers", Inorganic Chemistry, vol. 30, No. 13, pp. 2776–2781, Jun. 26, 1991.

*Primary Examiner*—Peter A. Hruskoci
*Attorney, Agent, or Firm*—Oblon, Spivak, McClelland, Maier & Neustadt, P.C.

[57] ABSTRACT

Process for the photocatalytic purification of waste water contaminated by tetrahydrothiophene, applicable to the purification of condensation water collected along gas distribution lines for household and industrial use.

10 Claims, No Drawings

PHOTOCATALYTIC PROCESS FOR PURIFYING WATER POLLUTED BY TETRAHYDROTHIOPHENE

This application is a continuation of application Ser. No. 09/089,161, filed on Jun. 2, 1998 now U.S. Pat. No. 6,027,654.

The present invention relates to a perfected process for the photocatalytic purification of water contaminated by tetrahydrothiophene.

Tetrahydrothiophene, an odorizing thioether, is normally added to gas for household and industrial use to reveal accidental losses along the distribution lines. Collection siphons of condensation water which contains a quantity of a few parts per million of the odorizing compound (THT), are installed along the gas transportation network.

These siphons are periodically emptied and the water recovered with a typically strong smell, due to the presence of the odorizing agent condensed together with it, making it necessary to carry out an appropriate flushing treatment before discharging into the atmosphere.

Among possible kinds of treatment, adsorption on active carbon has the disadvantage of also generating another waste product, consisting of the carbon itself impregnated with a badly-smelling material which must consequently be incinerated, together with other typical disadvantages linked to the treatment of liquid streams on active carbon beds.

Stripping with air is difficult to apply as the gaseous stream, if discharged into the air, causes obvious drawbacks. It is therefore necessary to collect the gaseous stream and effect further treatment to block the odorizing agent.

Treatment with chemical oxidants, such as hypochlorite for example, on the one hand eliminates the odor of the water but does not remove the presence of polluting compounds due to the oxidation of the original odorizing agent, normally characterized by a poor biodegradability.

A technique which is very frequently proposed for degrading water contaminated by organic compounds, consists in the photodegradation of the contaminants by means of radiation, solar or U.V., operating in the presence of metal oxide catalysts of the semiconductor type. The treatment, which takes place in the presence of oxygen, generally at room temperature, leads to the "mineralization" of the contaminants, which means the complete degradation of the toxic pollutant, with the formation of simple substances such as water, carbon dioxide and mineral acids.

Semiconductor metal oxides, such as titanium dioxide for example, are materials which have a particular electronic configuration: the valence band, at a lower energetic level, is completely occupied by the electrons, whereas the conduction band, with a higher energy, is almost completely empty.

When a similar semiconductor is radiated with energy photons higher than the "bandgap" (interval between the two bands), or equivalently with light having a wave-length lower than the "bandgap", the electrons pass from the valence band to the conduction band, leaving an electronic deficiency in the valence band and consequently causing the formation of electron-hole couples. The electrons are transferred to the semiconductor/liquid interface and the interactions between the electrons and/or the holes photogenerated, and the species adsorbed on the surface of the semiconductor and oxygen present in the system, cause the degradation of the contaminants.

From a technical-environmental point of view, photocatalysis has the following advantages with respect to the traditional technologies:

complete mineralization of a wide range of organic contaminants;

high separation efficiency at concentrations of the organic contaminant of the order of ppb;

absence of regenerative processes of the thermal type (as required for example by active carbon) which often create problems of an environmental nature relating to gaseous emissions; and the non-creation of microbic fouling phenomena typical of carbon filters.

We have now solved these problems with a photocatalytic process which enables the degradation of tetrahydrothiophene to obtain, in a simple and inexpensive way, an odorless water without pollutants or its intermediate degradation products.

In accordance with this, the present invention relates to a process for the purification of condensation water collected along gas distribution lines for household and industrial use, contaminated by tetrahydrothiophene, effected with the following steps:

dispersing solid particles of semiconductor metal oxide, having dimensions of about 0.5–3 $\mu$m, in said condensation water, in such a quantity that the concentration of the metal oxide is between 20 and 1000 ppm;

supplying oxygen or air to this dispersion at a pressure ranging from 50 to 300 mm of Hg;

radiating this dispersion, at room temperature, with U.V. light between 150 and 420 nm for a time ranging from 20 to 150 minutes.

According to the present invention, a semiconductor metal oxide in the form of dispersed particles is added, as catalyst, to the condensation water. Catalysts which can be used for the purpose are $ZnO$, $SnO_2$, $Fe_2O_3$, $TiO_2$ and $Fe_3O_4$. Among these titanium dioxide is preferred in anatase crystalline form for reasons of photocatalytic activity and its stability under the operating conditions. The catalyst is conveniently in the form of particles of 0.5–3 $\mu$m, so as to form a good dispersion of the catalyst in the aqueous phase. The concentration of the catalyst generally varies from 20 to 1000 ppm and is preferably about 50 ppm.

The dispersion of the catalyst in the polluted water is subjected to radiation with ultraviolet light until the organic contaminant contained therein has been completely degraded.

The radiation capable of activating a semiconductor catalyst, especially titanium dioxide, is ultraviolet radiation, especially near-ultraviolet radiation (300–400 nm). The radiation sources normally used are therefore (high, medium or low pressure) mercury arc lamps, or xenon lamps which emit with the U.V. field. These devices are available on the market.

Elongated cylindrical photochemical reactors are conveniently used, in which a tubular UV lamp is inserted along the greater axis of the reactor in order to obtain the highest possible quantitative yield. According to one embodiment of the invention, the suspension is continuously circulated between a container tank and the photochemical reactor.

In any case the operating temperature is room temperature, or temperatures close to room temperature, supplying oxygen or air to the photodegradation environment, in relation to the oxygen requirement of the decontamination system, for example up to a pressure for this water of about 200 mm Hg. When operating in accordance with the present invention, the times for complete, or almost complete, degradation of the tetrahydrothiophene are about 20–150 minutes.

At the end of the process, the tetrahydrothiophene is simply and economically eliminated to obtain completely deodorized water without the organic pollutant, completely transformed into carbon dioxide and sulfate ion.

The following examples provide a better illustration of the present invention.

EXAMPLE 1

400 ppm of titanium dioxide (Degussa P25) in anatase crystalline form, in the form of particles having a size of 0.5–3 µm, are added to a sample of condensation water collected from specific flushing siphons along the methane distribution line and containing tetrahydrothiophene (THT). The dispersion is stirred in the photocatalytic reactor consisting of a glass container having a volume of 400 ml in which a mercury vapor, low pressure, UV lamp having a power of 125 W, is immersed. The container is hermetically closed with the UV lamp off, and pressurized with oxygen at a pressure of 100 mm Hg. An initial sample of the dispersion is taken from a sampling and is analyzed with a gas chromatograph connected to a mass spectrometer.

Further samples of the dispersion are taken after one and two hours of stirring of the dispersion at room temperature and at a constant pressure of 100 mm Hg of oxygen, with the UV lamp switched off. The analytical results do not show any variation in the initial concentration of tetrahydrothiophene present in the water to be purified.

EXAMPLE 2

A second sample of water, identical to that used in example 1 but without the titanium dioxide, is charged into the photoreactor and illuminated with the UV lamp immersed therein. The dispersion is stirred, the temperature being maintained at values close to room temperature by water circulation in a cooling jacket constructed around the UV lamp. Samples of the dispersion are taken at time zero (lamp off) and after 15, 30 and 60 minutes of radiation. Analysis by gas chromatography-mass spectrometry indicate, after 60 minutes, a reduction in the initial concentration of THT of about 20% and the formation of intermediate compounds among which thiophene and thyram. The odor of the odorizing compound of the water discharged from the reactor at the end of the experiment remains unaltered.

EXAMPLE 3

400 ppm of titanium dioxide Degussa P25 is added to a third sample of water, identical to that used in the previous tests, and the mixture is charged into the photoreactor described above. The dispersion pressurized with oxygen at 100 mm Hg, as in the previous examples, is stirred at room temperature. After removing an initial sample, the UV lamp is switched on, the temperature of the dispersion being maintained at values close to room temperature by means of water cooling, as in the previous examples. Further dispersion samples are taken after 15, 30 and 60 minutes and gas mass analyzed under the same conditions as the previous examples. After only 15 minutes of radiation there is no sign of THT or the intermediate products observed in example 2, of which there are not even noticeable traces considering the extreme sensitivity of the analytical instrument. The sample at 15 minutes no longer has the typical odor of thioether.

EXAMPLE 4

Example 3 is repeated, using a smaller quantity of titanium dioxide, equal to 50 instead of 400 ppm. After 15 minutes of radiation the concentration of THT is equal to about a tenth of the initial concentration and after 30 minutes there are no traces of the starting tetrahydrothiophene or intermediate products observed in test 2.

What is claimed is:

1. A process for the purification of water containing tetrahydrothiophene, comprising:

dispersing particles of a semiconductor metal oxide in the water to be purified, contacting said water and particles with oxygen or air at a pressure ranging from 50 to 300 mm of Hg, and exposing said mixture to ultraviolet light for a time and under conditions suitable for photocatalytic degradation of tetrahydrothiophene.

2. The process of claim 1, wherein said water is waste water or water polluted or contaminated with tetrahydrothiophene.

3. The process of claim 1, wherein said water is condensation water.

4. The process of claim 1, wherein said semiconductor metal oxide is selected from the group consisting of ZnO, $SnO_2$, $Fe_2O_3$, $TiO_2$, and $Fe_3O_4$.

5. The process of claim 1, wherein the semiconductor metal particle size comprises particles from 0.5 to 3 um.

6. The process of claim 1, wherein said particles are dispersed in the water at a concentration of between 20 and 1000 ppm.

7. The process of claim 1, wherein the ultraviolet light comprises wavelengths between 150 and 420 nm.

8. The process of claim 1, wherein the ultraviolet light comprises wavelengths between 300 and 400 nm.

9. The process of claim 1, wherein said ultraviolet light is obtained from a mercury arc lamp or a xenon lamp.

10. The process of claim 1, wherein said water is continuously circulated between a container tank and the photochemical reactor.

* * * * *